(12) United States Patent
Cox

(10) Patent No.: US 6,682,114 B1
(45) Date of Patent: Jan. 27, 2004

(54) METHOD AND APPARATUS FOR EXTENDING A LENGTH OF A LIFT GATE

(75) Inventor: Marion T. Cox, Hillsboro, MO (US)

(73) Assignee: UniGroup, Inc., Fenton, MO (US)

( * ) Notice: Subject to any disclaimer, the term of this patent is extended or adjusted under 35 U.S.C. 154(b) by 0 days.

(21) Appl. No.: 10/375,673

(22) Filed: Feb. 26, 2003

(51) Int. Cl.⁷ .............................................. B62D 33/00
(52) U.S. Cl. ..................................... 296/26.08; 296/61
(58) Field of Search ............................. 296/26.08, 57.1, 296/59, 61, 62, 158; 414/537, 538; 14/69.5, 71.1

(56) References Cited

U.S. PATENT DOCUMENTS

| | | |
|---|---|---|
| 2,727,781 A | 12/1955 | D'Eath |
| 3,510,015 A | 5/1970 | Roshaven |
| 3,687,314 A | 8/1972 | Haugland |
| 3,779,406 A | 12/1973 | Hermann |
| 4,344,508 A | 8/1982 | Peck |
| 4,813,842 A | 3/1989 | Morton |
| 5,325,558 A * | 7/1994 | Labreche ..................... 414/537 |
| 5,540,474 A * | 7/1996 | Holland ........................ 296/61 |
| 5,598,595 A * | 2/1997 | Flinchum ..................... 296/61 |
| 5,769,593 A | 6/1998 | Buffaloe |
| 6,158,798 A * | 12/2000 | Stedtfeld et al. ............... 296/61 |
| 2002/0109367 A1 * | 8/2002 | Terrusa ..................... 296/26.08 |
| 2003/0039534 A1 * | 2/2003 | Radosevich et al. .......... 296/61 |
| 2003/0072641 A1 * | 4/2003 | Reed et al. ..................... 196/61 |

* cited by examiner

Primary Examiner—D. Glenn Dayoan
Assistant Examiner—Lori L Coletta
(74) Attorney, Agent, or Firm—Thompson Coburn LLP

(57) ABSTRACT

An extension for a lift gate of a truck is provided. The extension has an elongate member and an attachment portion at an end of the elongate member that is adapted to surround a portion of the lift gate in the manner to allow the extension to be removably attached to the lift gate without the use of separate fasteners. The elongate member overlaps with a platform of the lift gate and extends beyond the lift gate platform in a direction parallel to the platform when the extension is removably attached to the lift gate.

20 Claims, 2 Drawing Sheets

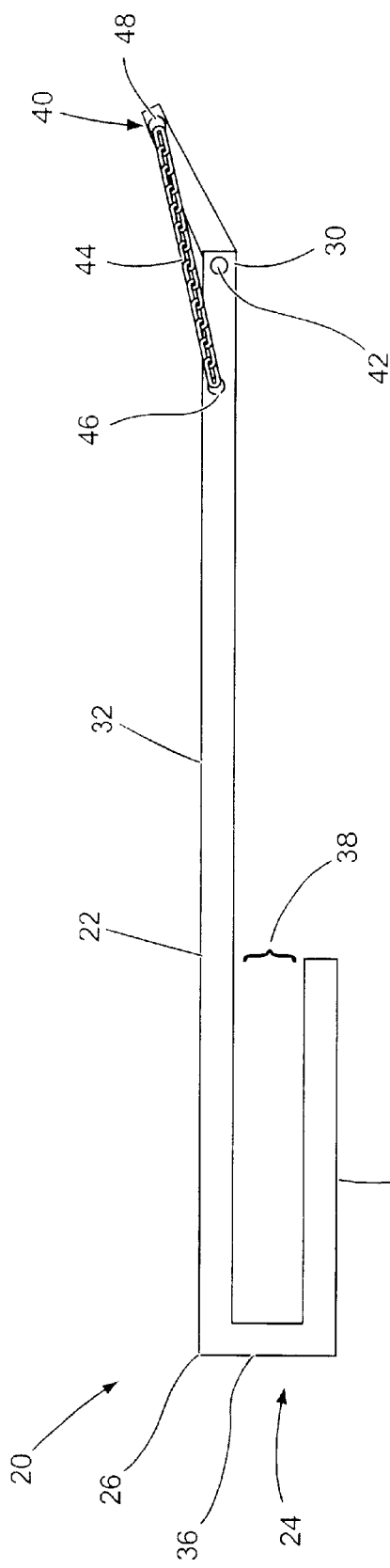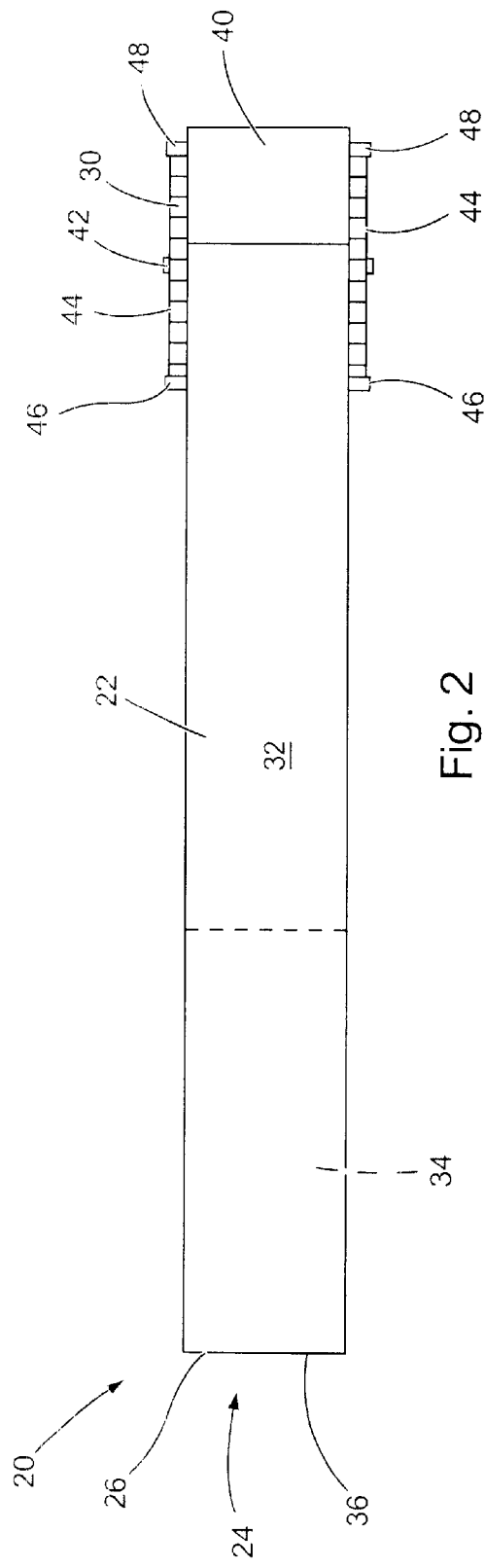

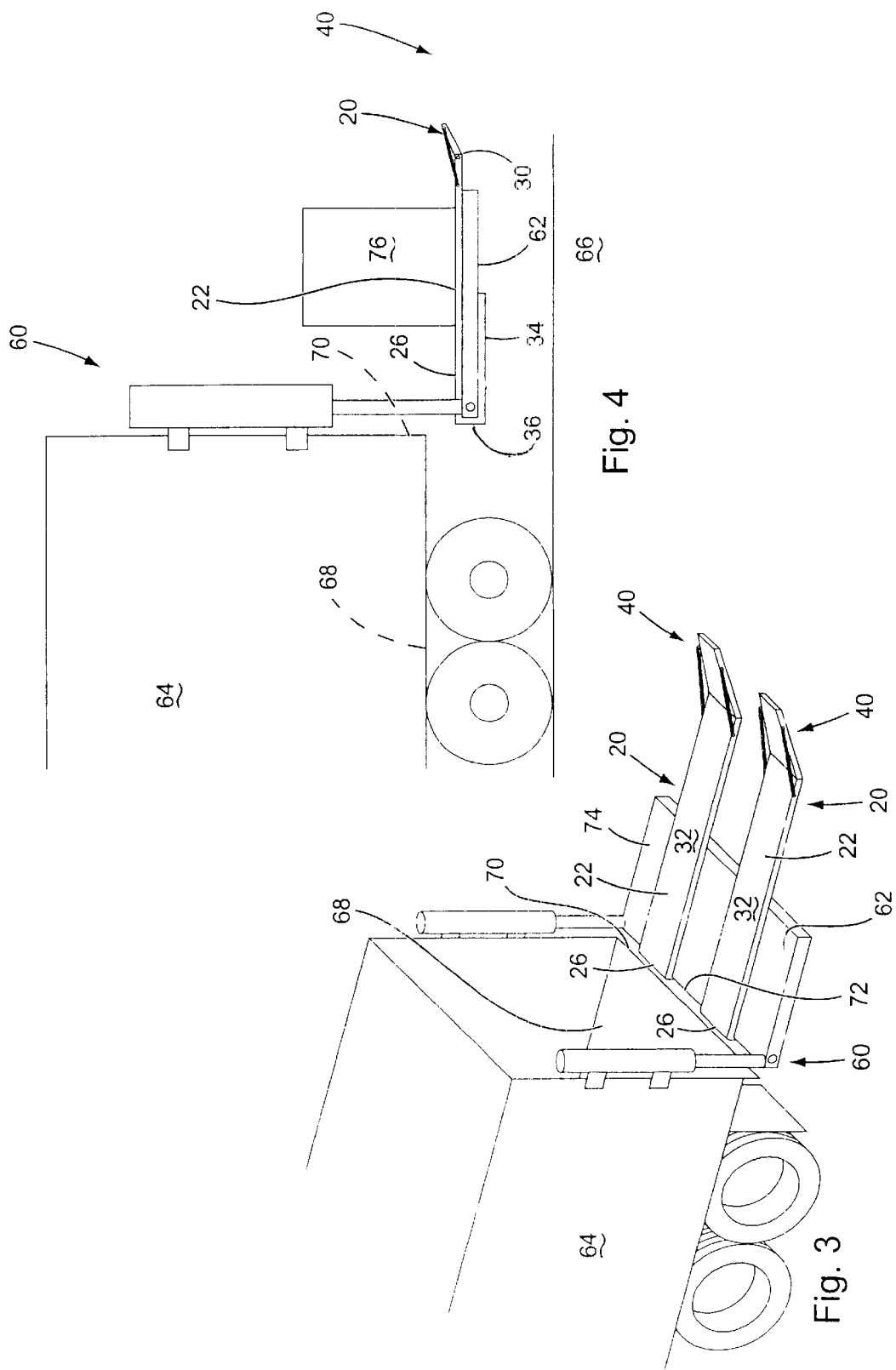

METHOD AND APPARATUS FOR EXTENDING A LENGTH OF A LIFT GATE

BACKGROUND OF THE INVENTION

(1) Field of the Invention

The present invention pertains to an apparatus used on a lift gate platform of a truck to extend the effective length of the lift gate platform. Typically, a lift gate such as the one described herein, is used on a truck to facilitate rear unloading/loading of the truck. The lift gate serves as a platform or an elevator which moves vertically from the bed surface of the truck to the ground level so that objects can be safely unloaded from the truck bed surface to the ground without the use of ramps or "walk-downs". The invention described herein extends the effective length of the lift gate to allow items having a length greater than the length dimension of the lift gate platform to be unloaded from the rear of the truck using the existing lift gate platform of the truck.

(2) Description of the Related Art

It is well-known that trucks having a rear cargo bed surface are useful in a variety of applications for moving objects from place to place and for storing objects. The challenge lies in providing a effective means for loading and unloading objects from the bed surface.

Commonly, pickup trucks have an exposed rear bed with a tailgate at the end of the bed which may be pivoted to a raised position to enclose the bed or to a lowered position to facilitate unloading of the bed. Most pickup trucks generally function in a wide variety of applications and manufacturers of pickup trucks generally design the trucks for a wide spectrum of buyers having different needs. Accordingly, most pickup trucks are not provided with a lift mechanism to allow objects to be raised from the ground level to the cargo bed. As the bed is stationary relative to the ground level, ramps are typically positioned on the end of the bed or tailgate to move objects to and from the bed.

Another type of truck which has been specifically designed for transporting and unloading freight is a moving van. The typical moving van has a bed which is fully enclosed and includes a rear door. In some designs of moving vans, the van may be provided with doors on its sides, in addition to the rear doors, to allow side access to the bed. Typically, ramps or "walk-downs" are provided at these access points to allow the movers to move the objects to and from the bed. In some designs of moving vans, a lift gate is provided at the rear of the van which may be used instead of the ramps to move objects to and from the bed.

Typically, a lift gate comprises a platform that pivots between a raised position where the lift gate platform has a vertical orientation and is positioned adjacent the rear doors of the truck, and a lowered position where the lift gate extends horizontally from the rear of the truck. Once in the lowered position, the lift gate platform may be raised and lowered vertically between the ground level and the bed surface of the truck like an elevator to facilitate rear unloading/loading of the moving truck. When the lift gate platform is no longer needed, it may be moved to the uppermost vertical position and pivoted to the vertically oriented position against the rear doors of the truck for storage. Typically, the lift gate is operatively connected to a hydraulic system which commonly includes hydraulic rams positioned on opposite sides of the rear doors.

The typical lift gate platform has a width dimension which extends across the rear of the truck and a length dimension which is usually constrained by the operational characteristics of the lift (hydraulic) system used to raise and lower the lift gate platform, and for this reason, a typical lift gate platform has a relatively "short" length in relation to its width. Conventional lift gate platforms used on moving vans are well suited for raising and lowering small and compact objects because these objects typically fit within the length and width size constraints of the lift gate platform. For objects having a length which exceeds that of the lift gate platform, ramps or walk-downs are commonly used to move the objects to and from the bed.

When using ramps, care must be used to ensure the objects are moved slowly and safely. Typically, moving objects up and down the ramps and "walk-downs" requires a significant amount of manual labor. Even when the objects have wheels or are placed on dollies, a significant amount of care must be used to ensure the objects are not damaged as they are rolled to and from the bed, and this tends to increase the overall cost of loading and unloading objects and therefore the overall costs of transportation of the objects. Additionally, the use of walk-downs and ramps also increases the risk of a safety mishap or damage to the object being moved. This is especially true where the objects being unloaded or loaded have a substantial weight.

Therefore, what is needed is a method and apparatus for safely moving relatively "long" objects from a truck bed without the use of walk-downs or ramps and by using the existing lift gate equipment installed on the truck. Such a method and apparatus would reduce the labor costs involved in moving objects, thereby reducing the overall cost of transportation of the objects. Additionally, such a method and apparatus would lower the risk of injury to movers unloading or loading a truck and also reduce the risk of damage to the objects being unloaded and loaded.

SUMMARY OF THE INVENTION

The present invention overcomes the disadvantages of the prior art by providing a method and apparatus for enlarging the size dimensions of a truck lift gate platform to enable unloading and loading objects from a truck bed surface using less manual labor and also lowering the risk of injury to the movers and damage to the objects being moved. The present invention utilizes existing lift gate equipment on the truck to safely and efficiently move objects having a length greater than that of the lift gate platform without permanently altering the lift gate or interfering with its normal operation. Thus, the present invention provides versatility and flexibility to allow use of the lift gate as it would normally be used to load and unload small and compact items from the truck, and with the apparatus and method of the invention disclosed herein, to use the lift gate to allow the loading and unloading of lengthy objects when needed.

In one aspect of the invention, an extension is provided for the lift gate of a truck. In a preferred embodiment of the invention the extension is one of a pair of like extensions. The truck has a bed surface for supporting and transporting objects and the lift gate has a platform adapted to support the objects as the lift gate is moved vertically between the raised and lowered positions relative to the truck bed. The extension comprises an elongate member having a length with an attachment portion at one end of the length and a distal end at an opposite end of the length. The attachment portion is configured to allow the extension to be solely supported from the lift gate when the extension is removably attached to the lift gate with the attachment portion. The elongate member length is greater than that of the lift gate platform such that the elongate member extends beyond the lift gate platform to its distal end when the extension is removably attached to the lift gate.

In this way, the extension may be attached to the lift gate to extend the effective length of the lift gate platform while allowing the lift gate to be operated as it normally would be operated. When the extension is no longer needed, it may be easily manually removed from the lift gate platform and stored in the truck, thereby allowing the lift gate to be pivoted to its vertically oriented position for storage, or returned to a normal condition as may be needed for raising/lowering small and compact items.

Preferably, the elongate member overlaps with the lift gate platform when the extension is removably attached to the lift gate. Additionally, the extension may be provided with a wheel stop which is pivotally attached to the elongate member distal end opposite of the attachment portion. Preferably, the wheel stop moves between an up position to prevent objects from rolling off the end of the elongate member and a down position to form a ramp to allow objects to be rolled from the distal end of the elongate member to a ground level. Preferably, the elongate member and the attachment portion are of a monolithic construction. Additionally, the extension preferably attaches to a proximal edge of the lift gate platform adjacent the truck bed when the extension is removably attached to the lift gate.

In another aspect of the present invention, a method is provided. The method comprises increasing the size of a lift gate platform for a truck having a bed for supporting and transporting objects and a lift gate adjacent the truck bed. The lift gate platform supports objects as they are moved vertically between raised and lowered positions of the platform relative to the bed. The method further comprises providing an extension comprising an elongate member provided with a length between an attachment portion at one end of its length and a distal end at an opposite end of its length that is greater in size than the lift gate platform. The method further comprises arranging the elongate member to overlap with the lift gate platform and engaging the attachment portion with a portion of the lift gate in a manner such that the extension is solely supported by the lift gate and extends beyond the lift gate platform to its cantilevered distal end.

In another aspect of the present invention a combination of a lift gate for a truck and an extension for the lift gate is provided. The lift gate of the truck has a bed for supporting objects and a platform that is adapted to support objects as the objects are moved between raised and lowered positions of the platform relative to the truck bed. The lift gate platform has a proximal edge closest to the truck bed and an opposite distal edge. The extension comprises a straight elongate member with opposite first and second ends and a length between the ends. The elongate member first end has an attachment portion that is removably attachable to the lift gate without the use of separate fasteners. The elongate member overlaps the lift gate platform and has its length sized such that the elongate member second end extends beyond the lift gate platform distal end in a cantilever manner, thereby extending an effective length of the lift gate platform.

As will be seen from the description that follows, the extension of the present invention allows for the effective use of the lift gate for relatively long objects so as to reduce the amount of manual labor that is needed to load and unload such objects and to reduce the risk of injury to the movers or damage to the objects being moved. Further objects and features of the invention are revealed in the following detailed description of the preferred embodiment of the invention and in the drawing figures.

BRIEF DESCRIPTION OF THE DRAWINGS

FIG. 1 shows a side view of an extension of the present invention;

FIG. 2 shows a top view of the extension of FIG. 1;

FIG. 3 shows a partial perspective view a moving van or truck with a lift gate and a pair of extensions having the configurations of the extension shown in FIG. 1 installed on the lift gate; and FIG. 4 shows a partial side view of the moving van or truck of FIG. 3 with the extension of FIG. 1 installed on the lift gate.

Corresponding reference numbers indicate corresponding parts throughout the several views of the drawings.

DETAILED DESCRIPTION OF THE PREFERRED EMBODIMENT

The lift gate extension of the invention is preferably employed in pairs of like extensions. Because the extensions are the same, only one extension will be described in detail. A lift gate extension 20 of the present invention is shown in FIGS. 1 and 2. The extension 20 is generally an elongate member 22 having a length with opposite proximal and distal ends. An attachment portion 24 is provided at a proximal end 26 for releasably attaching the extension to a lift gate platform, as will be described in greater detail below. The length of the elongate member 22 is sized to be greater than a length of a lift gate platform such that when the extension 20 is releasably attached to a lift gate platform, the distal end 30 of the elongate member projects in a cantilever manner beyond the lift gate platform. Preferably, the elongate member 22 is generally straight such that the distal end 30 of the elongate member projects in a direction which is parallel to a lift gate platform when the extension is removably attached to the platform. The elongate member has a top surface 32 which may be flat (FIG. 2) or may be provided with grooves to allow objects having wheels to be rolled onto the elongate member 22 with the wheels of the object being aligned in the grooves to provide lateral support for the object as it is positioned on the extension 20.

As shown in FIGS. 1 and 2, the attachment portion 24 preferably comprises a tongue portion 34 that is connected to the elongate member proximal end 26 by a back wall 36. The back wall 36 extends between the tongue portion 34 and the proximal end 26 of the elongate member creating a space 38 between the elongate member and the tongue portion, and the space 38 has a dimension that corresponds to a thickness of a lift gate platform. Preferably, the tongue portion 34 and the back wall 36 form the attachment portion 24 with a hook shape where the tongue portion extends below and along a portion of the length of the elongate member 22. The hook shape hooks over an edge of the lift gate platform such that the extension may be solely supported by the hook shape on the lift gate platform. This arrangement of the attachment portion 24 provides one example of releasably attaching the extension to a lift gate platform without the use of separate fasteners, as will be explained in greater detail below. However, it should be appreciated that the attachment may be formed in other configurations, such as in an inverted configuration to that shown in FIGS. 1 and 2, to allow the extension to be releasably attached to a lift gate platform without the use of separate mechanical fasteners.

Preferably, the elongate member 22 and attachment portion 24 are formed integrally, and more preferably, the elongate member and attachment portion are formed monolithically. Preferably, the elongate member 22 and attachment portion 24 are formed from a metal or other suitable material having a high strength and resiliency. The elongate member 22 and attachment portion 24 may be formed from rectangular tubular materials or from materials having an H-shaped cross section so as to reduce the bending moment and flexing that may be induced in the extension when it is loaded.

A wheel stop 40 is connected to the distal end 30 of the elongate member by a pivot connection 42. The pivot connection allows the wheel stop to move between an up position in which the wheel stop functions as a stop to prevent objects from rolling off the extension 20 and a down position in which the wheel stop functions as a ramp to allow objects to be rolled off the extension. To maintain the wheel stop 40 in the up position, a chain 44 is preferably provided between a pin 46 on a side of the elongate member and a pin 48 on a distal end of the wheel stop. Other latching mechanisms may also be provided to allow the wheel stop to be selectively pivoted between the up and down position as desired. Preferably, the wheel stop 40 forms a seamless transition with the elongate member top surface 32 thereby allowing wheeled objects to be easily rolled from the elongate member down the wheel stop. Preferably, the wheel stop 40 has sufficient length to form a gradual transition between the elongate member top surface 32 and a ground level or surface when objects are rolled from the extension to the ground.

Referring to FIGS. 3 and 4, when installing the extension 20 on a lift gate 60, a platform 62 of the lift gate is preferably pivoted from its vertical or stored position where it is folded up against the back of a truck 64 to its horizontal position where it extends rearwardly from the back of the truck. The lift gate platform 62 is then moved vertically to an intermediate position between a lowered or ground level position 66 and a raised or truck bed surface position 68 where the gate platform is positioned sufficiently away from a rear edge 70 of the truck bed surface to allow the extension to be inserted through the opening between the two. The extension 20 is preferably moved forwardly to a position where the attachment portion 24 is pushed off the forward or proximal edge 72 of the platform and extends beneath the truck bed surface 68. This positions the space 38 between the tongue portion 36 and the extension elongate member 22 adjacent the forward or proximal edge 72 of the lift gate platform, e.i., the edge closest to the bed of the truck. The extension 20 is then pulled rearwardly so that the tongue portion 34 moves beneath the platform 62 and the platform proximal edge 72 moves through the space 38 until the platform proximal edge is positioned against the attachment portion back wall 36. In this position, the extension 20 overlaps a top surface 74 of the lift gate platform and may be moved upwardly and downwardly with the lift gate platform. With the elongate member 22 overlapping the top surface 74 of the lift gate platform and the tongue 34 positioned underneath the lift gate platform, the attachment portion 24 provides a means for counterbalancing the extension 20 when it is mounted on the lift gate and loaded with the weight of objects 76 positioned on the extension. Preferably, the thickness of the attachment portion , the tongue 34 and the back wall 36 is sufficiently sized to enable the lift gate platform 62 to be moved upwardly and downwardly with the back wall in the gap between the lift gate platform proximal edge 72 and the rear edge 70 of the bed of the truck. As explained above, the attachment portion 24 is the sole means of attaching the extension 20 to the lift gate and does not require separate fasteners.

By providing two extensions 20 on the lift gate platform 62 and adjusting the horizontal spacing between the two, long and wide objects may be moved from the bed of the truck onto the extensions. Objects that have wheels or an object on a dolly may be safely wheeled onto the extensions by placing the wheel stops 40 in the up position. The lift gate platform 62 may then be lowered to the ground level and the wheel stops 40 unlocked to provide a ramp to allow the object and/or dolly to be rolled from the extensions onto the ground level.

So as to prevent mechanical failure of the hydraulic lifting mechanism and/or the lift gate extension, it is preferred that at least 75 percent of the weight of the object to be unloaded or loaded is positioned over the lift gate platform. Accordingly, it is preferred that the remaining 25 percent be placed on the portion of the extension that extends beyond the lift gate platform. These ratings depend upon the operational characteristics of the lift system and are only intended to be rough guidelines for the design parameters of the invention. When using the lift gate platform with the extensions installed to move objects from the bed to the extensions, it is preferred that lift gate platform be positioned vertically such that the top surface of the extension is at the same vertical height as the truck bed surface. Additionally, it is preferred that each extension back wall 36 be abutted against the proximal edge 72 of the lift gate platform 62 to provide maximum clearance between the extension back wall 36 and the rear edge 70 of the truck bed to allow the platform to move upwardly and downwardly without interference from the extension.

As described herein, the extension attachment portion has its tongue portion and back wall configured to surround a portion of the lift gate platform. The attachment portion may be configured to releasably attach to other structures of the lift gate, which may include not only the lift gate platform, but also pad-eyes or grooves formed in the lift gate that would provide a removable attachment without separate fasteners. It should be appreciated that it is within the scope of the present invention to provide an extension with an attachment portion so configured to allow the extension to be releasably attached to the lift gate and to allow the extension to be solely supported from the lift gate. Additionally, as described herein, the elongate member overlaps the top surface of the lift gate platform. It should be appreciated that it is within the scope of the invention to provide an extension with the elongate member configured so as to overlap a bottom surface of the lift gate and the attachment portion could be altered to permit use of the lift gate top surface for supporting objects as they are moved. Additionally, as described herein, the extension attachment portion is configured to engage with a proximal or forward edge of the lift gate. It should be appreciated that it is within the scope of the invention to provide the attachment portion configured to engage with the distal end or rear edge of the lift gate platform. The lift gate described herein is shown positioned at the rear of the truck. It should be appreciated that such a lift gate may also be provided at the side accesses to the truck bed, and accordingly, the extensions described herein could also be used in connection with such a lift gate. All of these modifications of the extension described in the preferred embodiment are considered to be within the scope of the invention.

As can be seen from the above description, the extension of the present invention permits a user of a truck or van to extend the effective length of the lift gate platform to allow long objects to be loaded and unloaded from the cargo bed. Because the extensions are removably attached to the lift gate platform, they may be installed or removed as desired depending upon the size of the object to be unloaded or loaded. By providing two or more extensions and adjusting the space between the extensions to correspond with the wheel base of the object to be moved, long and wide objects may be efficiently and safely moved.

Various other changes to the preferred embodiment of the invention described above may be envisioned by those of ordinary skill in the art. However, those changes and modifications should be considered as part of the invention which is limited only by the scope of the claims appended hereto and their legal equivalents.

What is claimed is:

1. An extension for a lift gate of a truck, the truck having a bed surface for supporting and transporting an object on the truck bed surface, the truck also having the lift gate at an end of the bed surface, the lift gate having a platform with a width dimension that extends along the platform across the end of the truck bed surface and a length dimension that extends along the platform outwardly from the end of the truck bed surface, the lift gate platform mounting to the truck for selective movement of the platform between raised and lowered positions of the platform relative to the truck bed surface where in the raised position the platform is positioned adjacent the truck bed surface enabling the object to be moved from the truck bed surface on to the platform, and where in the lowered position the platform is positioned adjacent a surface supporting the truck enabling the object to be moved from the platform onto the surface supporting the truck, the extension comprising:

an elongate member having a length with opposite proximal and distal ends;

an attachment portion at the proximal end of the elongate member, the attachment portion being removably attachable to the lift gate platform where the elongate member of the extension is secured to the lift gate platform solely by the attachment portion, the elongate member length being greater than the length dimension of the lift gate platform where the elongate member extends outwardly from the platform and beyond the platform to the elongate member distal end when the attachment portion is removably attached to the lift gate platform.

2. The extension of claim 1, further comprising:

the elongate member extending over the lift gate platform when the attachment portion is removably attached to the lift gate platform.

3. An extension for a lift gate of a truck, the truck having a bed surface for supporting and transporting an object on the truck bed surface, the truck also having the lift gate at an end of the bed surface, the lift gate having a platform with a width dimension that extends along the platform across the end of the truck bed surface and a length dimension that extends along the platform outwardly from the end of the truck bed surface, the lift gate platform mounting to the truck for selective movement of the platform between raised and lowered positions of the platform relative to the truck bed surface where in the raised position the platform is positioned adjacent the truck bed surface enabling the object to be moved from the truck bed surface on to the platform, and where in the lowered position the platform is positioned adjacent a surface supporting the truck enabling the object to be moved from the platform onto the surface supporting the truck, the extension comprising:

an elongate member having a length with opposite proximal and distal ends;

an attachment portion at the proximal end of the elongate member, the attachment portion being removably attachable to the lift gate platform where the elongate member of the extension is secured to the lift gate platform solely by the attachment portion, the elongate member length being greater than the length dimension of the lift gate platform where the elongate member extends outwardly from the platform and beyond the platform to the elongate member distal end when the attachment portion is removably attached to the lift gate platform; and further comprising:

a wheel stop pivotally attached to the distal end of the elongate member for pivoting movement of the wheel stop between raised and lowered positions of the wheel stop relative to the elongate member where in the raised position the wheel stop projects upwardly above the elongate member and in the lowered position the wheel stop projects downwardly below the elongate member, when the elongate member is removably attached to the lift gate platform by the attachment portion.

4. An extension for a lift gate of a truck, the truck having a bed surface for supporting and transporting an object on the truck bed surface, the truck also having the lift gate at an end of the bed surface, the lift gate having a platform with a width dimension that extends along the platform across the end of the truck bed surface and a length dimension that extends along the platform outwardly from the end of the truck bed surface, the lift gate platform mounting to the truck for selective movement of the platform between raised and lowered positions of the platform relative to the truck bed surface where in the raised position the platform is positioned adjacent the truck bed surface enabling the object to be moved from the truck bed surface on to the platform, and where in the lowered position the platform is positioned adjacent a surface supporting the truck enabling the object to be moved from the platform onto the surface supporting the truck, the extension comprising:

an elongate member having a length with opposite proximal and distal ends;

an attachment portion at the proximal end of the elongate member, the attachment portion being removably attachable to the lift gate platform where the elongate member of the extension is secured to the lift gate platform solely by the attachment portion, the elongate member length being greater than the length dimension of the lift gate platform where the elongate member extends outwardly from the platform and beyond the platform to the elongate member distal end when the attachment portion is removably attached to the lift gate platform; and further comprising:

the elongate member and attachment portion are one monolithic piece.

5. The extension of claim 1, for a truck life gate having opposite proximal and distal edges between the length dimension of the lift gate, the lift gate platform proximal end being positioned adjacent the truck bed surface, the extension further comprising:

the attachment portion of the elongate member being removably attachable to the lift gate platform proximal end when the elongate member is removably attached to the lift gate platform.

6. An extension for a lift gate of a truck, the truck having a bed surface for supporting and transporting an object on the truck bed surface, the truck also having the lift gate at an end of the bed surface, the lift gate having a platform with a width dimension that extends along the platform across the end of the truck bed surface and a length dimension that extends along the platform outwardly from the end of the truck bed surface, the lift gate platform mounting to the truck for selective movement of the platform between raised and lowered positions of the platform relative to the truck bed surface where in the raised position the platform is positioned adjacent the truck bed surface enabling the object to be moved from the truck bed surface on to the platform, and where in the lowered position the platform is positioned adjacent a surface supporting the truck enabling the object to be moved from the platform onto the surface supporting the truck, the extension comprising:

- an elongate member having a length with opposite proximal and distal ends;
- an attachment portion at the proximal end of the elongate member, the attachment portion being removably attachable to the lift gate platform where the elongate member of the extension is secured to the lift gate platform solely by the attachment portion, the elongate member length being greater than the length dimension of the lift gate platform where the elongate member extends outwardly from the platform and beyond the platform to the elongate member distal end when the attachment portion is removably attached to the lift gate platform; and
- further comprising:
  - the attachment portion comprising an end wall that projects from the proximal end of the elongate member at an angle relative to the elongate member and a tongue portion connected to the end wall and projecting from the end wall at an angle relative to the end wall and along a portion of the length of the elongate member, the end wall defining a space between the elongate member and the tongue portion that is dimensioned to receive the lift gate platform in the space.

7. The extension of claim 1, further comprising:

the elongate member being one of a pair of separate elongate members that each have an attachment portion that is removably attachable to the lift gate platform.

8. A method of extending a length of a lift gate platform of a truck having a truck bed surface for supporting and transporting objects with the lift gate at one end of the truck bed surface, the lift gate having a platform with a width dimension that extends along the platform across the end of the bed surface and the platform having a length dimension that extends along the platform outwardly from the end of the bed surface, the lift gate platform mounting to the truck for selective movement of the platform between raised and lowered positions of the platform relative to the truck bed surface where in the raised position the platform is positioned adjacent the truck bed surface enabling an object to be moved from the truck bed surface onto the platform, and where in the lowered position the platform is positioned adjacent a surface supporting the truck enabling the object to be moved from the platform on to the surface supporting the truck, the method comprising:

providing an extension for the lift gate that is comprised of an elongate member having a length with opposite proximal and distal ends;

providing an attachment portion at the elongate member proximal end that is adapted to be removably attached solely to the lift gate;

positioning the attachment portion of the elongate member on the lift gate with the length of the elongate member being greater than the length dimension of the lift gate platform whereby the elongate member projects beyond the lift gate platform to the distal end of the elongate member when the attachment portion is removably attached to the lift gate platform.

9. The method of claim 8, further comprising:

positioning the lift gate platform between its raised and lowered positions when removably attaching the elongate member attachment portion to the lift gate platform.

10. The method of claim 8, further comprising:

positioning the elongate member along the width dimension of the lift gate platform where the elongate member is aligned with the object to be moved from the truck bed surface onto the platform.

11. The method of claim 8, further comprising:

raising the lift gate platform to its raised position relative to the truck bed surface following removably attaching the elongate member attachment portion to the lift gate platform.

12. The method of claim 11, further comprising:

moving the object from the truck bed surface onto the elongate member removably attached to the lift gate platform.

13. The method of claim 12, further comprising:

following moving of the object from the truck bed surface onto the elongate member removably attached to the lift gate platform, moving the lift gate platform from its raised position to its lowered position.

14. The method of claim 8, further comprising: providing the elongate member of the extension as one of a pair of elongate members, each elongate member of the pair having a length with opposite proximal and distal ends and an attachment portion at the proximal end that removably attaches the elongate member to the lift gate platform.

15. An extendable lift gate apparatus for a truck having a bed surface for supporting and transporting objects on the truck bed surface, the apparatus comprising:

a lift gate at an end of the truck bed surface, the lift gate having a platform with a width dimension that extends along the platform across the end of the truck bed surface and a length dimension that extends along the platform outwardly from the end of the truck bed surface, the lift gate platform mounting to the truck for selective movement of the platform between raised and lowered positions of the platform relative to the truck bed surface where in the raised position the lift gate platform is positioned adjacent the truck bed surface enabling an object to be moved from the truck bed surface onto the platform and where in the lowered position the lift gate platform is positioned adjacent a surface supporting the truck enabling the object to be moved from the platform onto the surface supporting the truck; and, an extension comprising an elongate member having a length with opposite proximal and distal ends, an attachment portion at the elongate member proximal end that is adapted to be removably attached to the lift gate platform with the elongate member extending over the lift gate platform and the length of the elongate member projecting outwardly from the lift gate platform to the elongate member distal end.

16. The apparatus of claim 15, further comprising:

the length of the elongate member being greater than the length dimension of the lift gate platform.

17. The apparatus of claim 15, further comprising:

the lift gate platform having opposite proximal and distal edges on opposite ends of the width dimension of the lift gate platform, the lift gate platform proximal edge being adjacent the end of the truck bed surface, and the attachment portion of the elongate member being removably attached to the lift gate platform proximal edge.

18. An extendable lift gate apparatus for a truck having a bed surface for supporting and transporting objects on the truck bed surface, the apparatus comprising:

a lift gate at an end of the truck bed surface, the lift gate having a platform with a width dimension that extends along the platform across the end of the truck bed surface and a length dimension that extends along the Platform outwardly from the end of the truck bed surface, the lift gate platform mounting to the truck for selective movement of the platform between raised and lowered positions of the platform relative to the truck bed surface where in the raised position the lift gate platform is positioned adjacent the truck bed surface enabling an object to be moved from the truck bed surface onto the platform and where in the lowered position the lift gate platform is positioned adjacent a surface supporting the truck enabling the object to be moved from the platform onto the surface supporting the truck; and an extension comprising an elongate member having a length with opposite proximal and distal ends, an attachment portion at the elongate member proximal end that is adapted to the be removably attached to the lift gate platform with the elongate member extending over the lift gate platform and the length of the elongate member projecting outwardly from the lift gate platform to the elongate member distal end; and further comprising:

the attachment portion including an end wall that projects from the elongate member proximal end at an angle relative to the elongate member and a tongue portion that projects from the end wall at an angle relative to the end wall in a manner such that the end wall defines a space between the elongate member and the tongue portion that is dimensioned to receive the lift gate platform in the space.

19. The apparatus of claim 15, further comprising:

a wheel stop pivotally mounted to the elongate member distal end for movement of the wheel stop between raised and lowered positions of the wheel stop relative to the elongate member where in the raised position the wheel stop projects upwardly above the elongate member and in the lowered position the wheel stop projects downwardly below the elongate member when the elongate member is removably attached to the lift gate platform by the attachment portion.

20. The apparatus of claim 15, further comprising:

the elongate member being one of a pair of separate elongate members, each elongate member having a length between opposite proximal and distal ends of the elongate member and each elongate member having an attachment portion at the elongate member proximal end that is adapted to removably attach the elongate member to the lift gate platform.

* * * * *